(12) United States Patent
Demiralp et al.

(10) Patent No.: US 10,949,753 B2
(45) Date of Patent: Mar. 16, 2021

(54) CAUSAL MODELING AND ATTRIBUTION

(71) Applicant: Adobe Inc., San Jose, CA (US)

(72) Inventors: Emre Demiralp, San Francisco, CA (US); Walter W. Chang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 391 days.

(21) Appl. No.: 14/244,755

(22) Filed: Apr. 3, 2014

(65) Prior Publication Data

US 2015/0286928 A1 Oct. 8, 2015

(51) Int. Cl.
*G06N 5/02* (2006.01)

(52) U.S. Cl.
CPC ..................... *G06N 5/02* (2013.01)

(58) Field of Classification Search
None
See application file for complete search history.

(56) References Cited

U.S. PATENT DOCUMENTS

| | | | |
|---|---|---|---|
| 8,667,169 B2 | 3/2014 | Patil et al. | |
| 8,838,438 B2 | 9/2014 | Leary et al. | |
| 9,020,956 B1* | 4/2015 | Barr | G06F 17/30011 707/748 |
| 2004/0249700 A1 | 12/2004 | Gross | |
| 2005/0262214 A1 | 11/2005 | Bagga et al. | |
| 2006/0042483 A1* | 3/2006 | Work | G06Q 10/00 101/91 |
| 2007/0294230 A1 | 12/2007 | Sinel et al. | |
| 2008/0097758 A1 | 4/2008 | Li et al. | |
| 2009/0193011 A1 | 7/2009 | Blair-Goldensohn et al. | |
| 2009/0319342 A1* | 12/2009 | Shilman | G06F 17/30864 705/7.41 |
| 2010/0094878 A1 | 4/2010 | Soroca et al. | |
| 2010/0235313 A1 | 9/2010 | Rea et al. | |
| 2010/0280985 A1 | 11/2010 | Duchon et al. | |
| 2010/0312769 A1* | 12/2010 | Bailey | G06F 17/30705 707/740 |
| 2011/0078167 A1 | 3/2011 | Sundaresan et al. | |

(Continued)

OTHER PUBLICATIONS

S. Stieglitz and L. Dang-Xuan, "Emotions and information diffusion in social media—Sentiments of microblogs and sharing behavior ", Journal of management information systems, 29.4, 2013, pp. 217-248. (Year: 2013).*

(Continued)

*Primary Examiner* — Vincent Gonzales
(74) *Attorney, Agent, or Firm* — FIG. 1 Patents

(57) ABSTRACT

In techniques for causal modeling and attribution, a causal modeling application implements a dynamical causal modeling framework. Input data is received as a representation of communications between users, such as social media interactions between social media users, and causal relationships between the users can be determined based in part on the input data that represents the communications. Influence variables, such as exogenous variables and/or endogenous variables, can also be determined that influence the causal relationships between the users. A causal relationships model is generated based on the influence variables and the causal relationships between the users, where the causal relationships model is representative of causality, influence, and attribution between the users.

20 Claims, 8 Drawing Sheets

(56) References Cited

U.S. PATENT DOCUMENTS

| | | | |
|---|---|---|---|
| 2011/0173191 A1* | 7/2011 | Tsaparas | G06Q 30/02 707/723 |
| 2011/0179009 A1 | 7/2011 | Nam | |
| 2011/0282860 A1 | 11/2011 | Baarman et al. | |
| 2012/0137367 A1* | 5/2012 | Dupont | G06F 21/00 726/25 |
| 2012/0143597 A1 | 6/2012 | Mushtaq et al. | |
| 2012/0259617 A1 | 10/2012 | Indukuri et al. | |
| 2012/0278064 A1 | 11/2012 | Leary et al. | |
| 2013/0036126 A1 | 2/2013 | Anderson | |
| 2013/0073336 A1 | 3/2013 | Heath | |
| 2013/0151531 A1 | 6/2013 | Li et al. | |
| 2013/0204882 A1 | 8/2013 | Blaschak et al. | |
| 2013/0212479 A1* | 8/2013 | Willis | G06Q 10/10 715/736 |
| 2013/0231920 A1 | 9/2013 | Mathew et al. | |
| 2013/0238316 A1 | 9/2013 | Shastri et al. | |
| 2013/0268262 A1 | 10/2013 | Moilanen et al. | |
| 2013/0275527 A1 | 10/2013 | Deurloo | |
| 2013/0282430 A1 | 10/2013 | Kannan et al. | |
| 2013/0290317 A1 | 10/2013 | Spivack et al. | |
| 2014/0040288 A1 | 2/2014 | Galitsky | |
| 2014/0067370 A1 | 3/2014 | Brun | |
| 2014/0089327 A1 | 3/2014 | Pavlidis et al. | |
| 2014/0164302 A1 | 6/2014 | Di Fabbrizio et al. | |
| 2014/0171088 A1* | 6/2014 | Edara | H04W 36/32 455/440 |
| 2014/0194208 A1* | 7/2014 | Splaine | G06Q 30/02 463/42 |
| 2014/0229159 A1 | 8/2014 | Branton | |
| 2014/0358891 A1 | 12/2014 | Anstandig et al. | |
| 2014/0359480 A1 | 12/2014 | Vellal et al. | |
| 2015/0095021 A1 | 4/2015 | Spivack et al. | |
| 2015/0263925 A1* | 9/2015 | Shivashankar | H04L 67/306 706/12 |
| 2015/0286619 A1 | 10/2015 | Chakra et al. | |
| 2015/0286627 A1 | 10/2015 | Chang et al. | |
| 2015/0286710 A1 | 10/2015 | Chang | |
| 2015/0356571 A1 | 12/2015 | Chang et al. | |

OTHER PUBLICATIONS

M. Ebden, "Gaussian processes for regression: A quick introduction", The Website of Robotics Research Group in Department of Engineering Sciences, University of Oxford, 91, Aug. 2008, 13 pages. (Year: 2008).*

S. He et al., "Identifying peer influence in online social networks using transfer entropy", Pacific-Asia Workshop on Intelligence and Security Informatics, Springer, Berlin, 2013, pp. 47-61. (Year: 2013).*

K. Gimpel, et al., "Part-of-speech tagging for twitter: Annotation, features, and experiments", Carnegie-Mellon Univ., School of Computer Science, report Jan. 2010, 6 pages. (Year: 2010).*

"Non-Final Office Action", U.S. Appl. No. 14/297,187, dated Oct. 6, 2015, 12 pages.

"Non-Final Office Action", U.S. Appl. No. 14/244,665, dated Feb. 11, 2016, 9 pages.

"Final Office Action", U.S. Appl. No. 14/244,665, dated Jun. 1, 2016, 12 pages.

"Final Office Action", U.S. Appl. No. 14/297,187, dated Sep. 22, 2016, 16 pages.

"Non-Final Office Action", U.S. Appl. No. 14/244,801, dated Aug. 12, 2016, 31 pages.

Kumar"Identifying Themes in Social Media and Detecting Sentiments", Copyright 2010 Hewlett-Packard Development Company, L.P., Apr. 6, 2010, 7 pages.

Pang,"Thumbs up? Sentiment Classification using Machine Learning Techniques", Proceedings of the Conference on Empirical Methods in Natural Language Processing (EMNLP), Philadelphia, Association for Computational Linguistics, Jul. 2002, pp. 79-86.

"Final Office Action", U.S. Appl. No. 14/244,665, dated Jun. 1, 2017, 11 pages.

"Non-Final Office Action", U.S. Appl. No. 14/297,187, dated Jun. 1, 2017, 14 pages.

"Non-Final Office Action", U.S. Appl. No. 14/244,801, dated Aug. 14, 2017, 56 pages.

"Examiner's Answer to Appeal Brief", U.S. Appl. No. 14/244,665, dated Jan. 22, 2018, 11 pages.

"Non-Final Office Action", U.S. Appl. No. 14/297,187, dated Jan. 18, 2018, 20 pages.

"Non-Final Office Action", U.S. Appl. No. 14/244,665, dated Nov. 15, 2016, 11 pages.

"PTAB Decision", U.S. Appl. No. 14/244,665, filed Dec. 19, 2018, 13 pages.

"Final Office Action", U.S. Appl. No. 14/297,187, dated Oct. 2, 2018, 30 pages.

"Final Office Action", U.S. Appl. No. 14/244,801, dated Jun. 15, 2018, 68 pages.

"Non-Final Office Action", U.S. Appl. No. 14/244,801, dated Aug. 13, 2019, 21 pages.

Chis,"Patterns of Memory Inefficiency", Jul. 2011, 26 pages.

Wang,"Maximum Entropy Model Parameterization with TF IDF Weighted Vector Space Model", https://ieeexplore.ieee.org/stamp/stamp.jsp?arnumber=4430111, Dec. 2007, 213-218.

"Final Office Action", U.S. Appl. No. 14/244,801, dated Mar. 31, 2020, 22 pages.

Filgueiras,"POPSTAR at RepLab 2013: Polarity for Reputation Classification", http://ims-sites.dei.unipd.it/documents/71612/430938/CLEF2013wn-Replab-FilgueirasEt2013.pdf, 7 pages.

"Examiner's Answer to Appeal Brief", U.S. Appl. No. 14/297,187, dated Jan. 3, 2020, 9 pages.

* cited by examiner

CAUSAL MODELING AND ATTRIBUTION

BACKGROUND

Marketing analysts strive to obtain information about topics that customers are discussing and communicating, as well as the opinions or sentiments that may be expressed by the customers in communications about the topics. Companies that provide products and/or services want to know and understand how well a product or service is received, areas where customers are unhappy with the product or service, and to identify product and/or service suggestions or enhancements from customers. Further, it can be important to determine the influence of users, the topics, sentiments, and other variables in social media. Answers to questions, such as "How did a particular topic influence people's emotion?" or "How did users' sentiments influence the topics that were discussed in social media?" are important for monitoring and moderating social media content.

The marketing analysts also want to be able to quantify this influence because scores are easier to comprehend and use for analysis. Conventional approaches to determine users' influences can be biased and oversimplified. For example, a conventional approach may determine that the President has a lower influence score than various bloggers, which indicates that the approach does not accurately dissociate between the quantity of words and communications (e.g., less for the President than the bloggers) and the impact of the words and communications that one says. Further, the volume of information to analyze is often quite large, such as thousands of communications about any number of various topics. To manually sort and analyze thousands of communications, such as from the customers of a product or service provider, is labor intensive, tedious, and can be error-prone.

SUMMARY

This Summary introduces features and concepts of causal modeling and attribution, which is further described below in the Detailed Description and/or shown in the Figures. This Summary should not be considered to describe essential features of the claimed subject matter, nor used to determine or limit the scope of the claimed subject matter.

Causal modeling and attribution is described. In embodiments, a causal modeling application implements a dynamical causal modeling framework. Input data is received as a representation of communications between users, such as social media interactions between social media users, and causal relationships between the users can be determined based in part on the input data that represents the communications. Influence variables, such as exogenous variables and/or endogenous variables, can also be determined that influence the causal relationships between the users. Endogenous variables are dependent variables or factors in a causal model whose value can be changed or determined based on functional relationships in the model. The endogenous variables can be moderated by feedback from one or more of the users, and a value of an endogenous variable may change, or is determinable, based on the feedback from the users in the modeling framework. Exogenous variables are independent variables or factors in a causal model whose value is independent from the states of other variables in the model, and can have an affect on the model without being affected by it. The exogenous variables independently influence the causal relationships without being affected by feedback from the users in the modeling framework. The causal relationships between the users can be determined based on the input data and simultaneous modeling of the endogenous variables and the exogenous variables.

In embodiments, a causal relationships model is generated based on the influence variables and the causal relationships between the users, where the causal relationships model is representative of causality, influence, and attribution between the users. The dynamical causal modeling framework can also quantify the causal relationships with influence scores that each indicate a degree to which one of the users influence a causal relationship with another of the users. Additionally, the causal relationships between the two or more users may be non-symmetric, and the causal relationships model is further generated to represent the non-symmetric causal relationships between the users.

BRIEF DESCRIPTION OF THE DRAWINGS

Embodiments of causal modeling and attribution are described with reference to the following Figures. The same numbers may be used throughout to reference like features and components that are shown in the Figures.

DETAILED DESCRIPTION

Embodiments of causal modeling and attribution are described as techniques to analyze text data, such as in the form of communications between two or more users, which may be communications between agents, any number of social media users communicating with one another, customer service representatives and customers, and any other group of people who are communicating on-line with one another. A causal modeling application implements a dynamical causal modeling framework to determine the causal relationships between topics, sentiment, and other variables of interest in text shared on social media, such as in blogs and other interactive dialogs. Generally, a causal relationship can be modeled to account for the relationships between cause and effect, or connections between factors, such as the influences of user communications on other users, as described herein. The communications can be represented as values, and causal determinations can be made about the communications. For example, the techniques can be used to identify whether a particular post on a social media site predicts a discussion of certain topics in social media, and vice-versa. Any aspect of textual content that can be quantified, as well as other quantitative indicators, such as stock prices and dates, can be used in this modeling framework. Features of causal modeling and attribution may be utilized for various, different applications, such as for content management, metadata, data mining, semantic analysis, multi-user authoring, content monetization, advertising, advertisement insertion, behavior tracking, demographic analytics, social network analytics, and for many other applications.

While features and concepts of causal modeling and attribution can be implemented in any number of different devices, systems, networks, environments, and/or configurations, embodiments of causal modeling and attribution are described in the context of the following example devices, systems, and methods.

Figure 1:
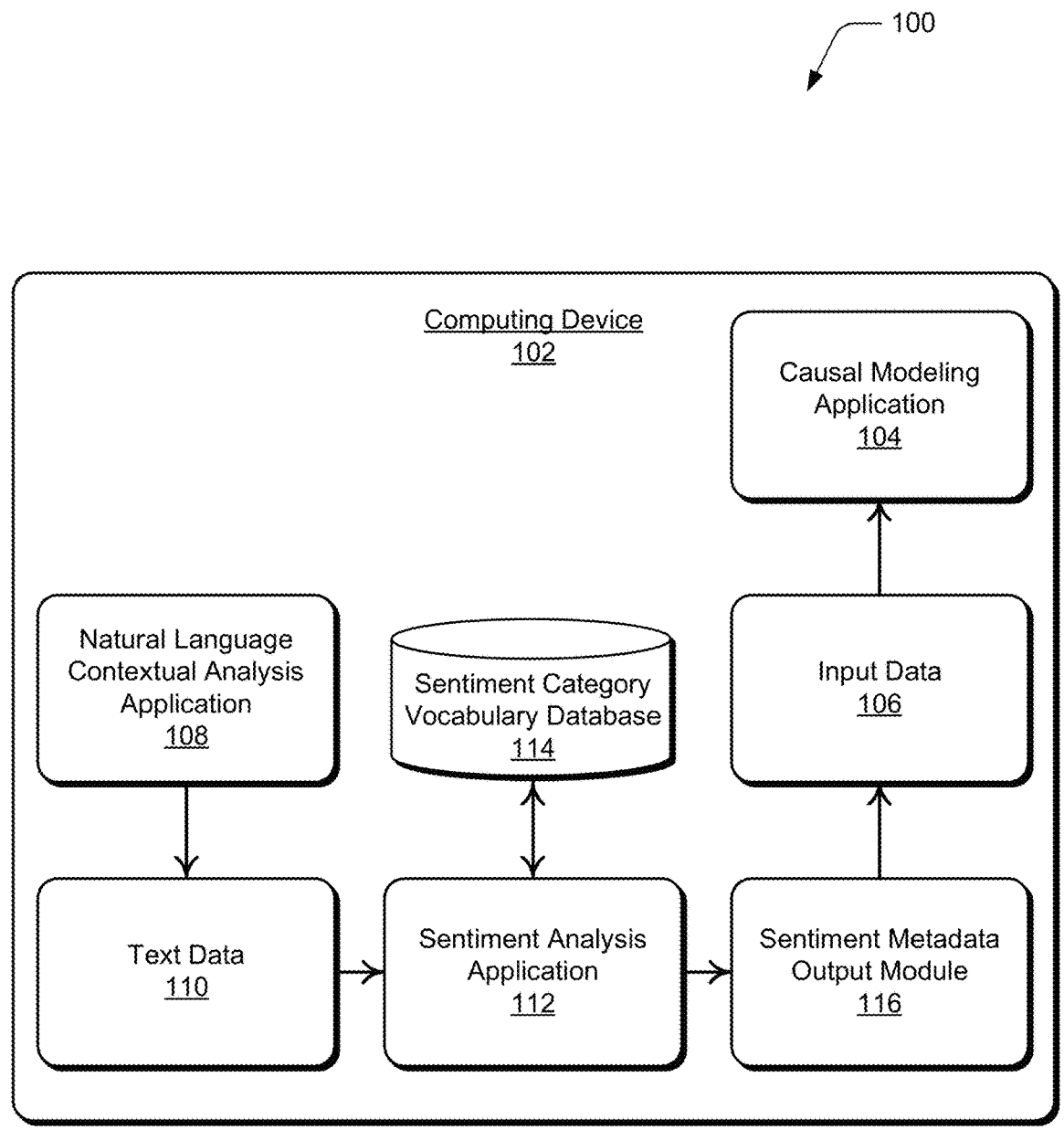
FIG. 1 illustrates an example of a device that implements a causal modeling application to implement causal modeling and attribution in accordance with one or more embodiments.

FIG. 1 illustrates an example 100 of a computing device 102 that implements a causal modeling application 104 in embodiments of causal modeling and attribution. The causal modeling application 104 can be implemented as a software application, such as executable software instructions (e.g., computer-executable instructions) that are executable by a processing system of the computing device 102 and stored on a computer-readable storage memory of the device. The computing device can be implemented with various components, such as a processing system and memory, and with any number and combination of differing components as further described with reference to the example device shown in FIG. 8.

In embodiments, the causal modeling application 104 implements techniques for causal modeling and attribution of input data 106 that is input to the causal modeling application. The input data is generated as a representation of communications between users, such as social media interactions between social media users, communications between agents, or communications between customers and customer service representatives. In implementations, the input data can be generated as vector space representations of the communications that are represented as values. The causal modeling application 104 is implemented to determine causal relationships between the users based in part on the input data 106 that represents the communications. The input data, together with other data about current economic indicators, time of year, and any other exogenous factors are input to the causal modeling application 104, which then generates a causal relationships model based on these data, and outcomes can be attributed to causal relationships within and across endogenous and exogenous variables.

The causal modeling application 104 implements a comprehensive framework for inferring and quantifying causality using dynamical causal modeling (DCM). Dynamical causal modeling can be utilized to infer cyclical causal relationships, such as the influence of a user A on a user B may be different than the influence of user B on user A. Generally, a causal relationship can be modeled to account for the relationships between cause and effect, or connections between factors, such as the influences of user communications on other users, as described herein. Further, dynamical causal modeling does not assume that random fluctuations are serially uncorrelated, thus allowing for more accurate and simultaneous modeling of influence variables, such as endogenous and exogenous variables.

The endogenous variables are dependent variables or factors in a causal model whose value can be changed or determined based on functional relationships in the model. The endogenous variables can be moderated by feedback from one or more of the users, and a value of an endogenous variable may change, or is determinable, based on the feedback from the users in the modeling framework. The exogenous variables are independent variables or factors in a causal model whose value is independent from the states of other variables in the model, and can have an affect on the model without being affected by it. The exogenous variables independently influence the causal relationships without being affected by feedback from the users in the modeling framework. For example, an endogenous social influencer, such as an on-line blogger, is a user whose behavior is likely to change based on feedback from the other users in a system, whereas an exogenous social influencer could be a topic, such as the date or a holiday, and influence is not moderated by social media discussions.

In embodiments, the causal modeling application 104 provides an accurate modeling of causality, influence, and attribution. For instance, when making inferences about the influences of particular social media posts, the causal modeling application is robust to signals that tend to have hysteresis and/or an inertia. Most aspects of on-line communications have their own ebb and flow, and the causal relationships are determined above and beyond that. As noted above, the causal modeling application 104 is implemented for cyclical causal modeling (e.g., user A influences user B, and user B influences user A). For example, a customer service representative (e.g., user A) may be communicating with a concerned client (e.g., user B) on a social media channel, and the causal relationships for user A to user B, and user B to user A, can be separately and accurately determined. The causal modeling application 104 is implemented for processes with hysteresis (e.g., autocorrelation), and can simultaneously model the endogenous and exogenous variables. Modules and other features of the sentiment analysis application 112 are further described with reference to FIG. 3.

In this example 100, the computing device 102 also includes a natural language contextual analysis application 108 (e.g., a software application) that is implemented to generate text data 110. Alternatively, the natural language contextual analysis application 108 may be implemented by another computing device (or server system) at which the text data 110 is generated and communicated to the computing device 102 as text data input to a sentiment analysis application 112 (e.g., a software application). The sentiment analysis application 112 implements techniques for contextual sentiment text analysis of the text data.

The text data 110 can include any type of communications between users, such as sentences, messages, documents, on-line interactions, and the like, and also includes identified noun expressions, identified verb expressions, and tagged part-of-speech information, as determined by the natural language contextual analysis application 108. The natural language contextual analysis application 108 is a document, paragraph, and sentence segmenter, tokenizer, and a part-of-speech tagger that uses optimized lexical and contextual rules for grammar transformation. In implementations, the natural language contextual analysis application 108 generates a segmented and tokenized word punctuation list for each sentence of the text data.

The computing device 102 can also include a sentiment category vocabulary database 114 that is implemented as an input to the sentiment analysis application 112. As with the natural language contextual analysis application 108, the sentiment category vocabulary database 114 may be implemented by another computing device (or server system) that communicates with the computing device 102 for use of the vocabulary database by modules of the sentiment analysis application 112. Modules and other features of the sentiment analysis application 112 are further described with reference to FIG. 5. The sentiment category vocabulary database 114 is a non-contextualized affect and sentiment vocabulary database containing pre-defined vocabulary and phrase elements. In implementations, the sentiment category vocabulary database is organized by category and developed by machine learning that processes hundreds of thousands of annotated or semi-annotated review examples across hundreds of topic categories, such as from on-line reviews, blogs, and the like. The sentiment category vocabulary database 114 includes contextual sentiment term vocabulary and term weights for each domain category, and topic model keywords are then used to select specific category weightings that are used by the modules of the sentiment analysis application 112.

The computing device 102 also includes a sentiment metadata output module 116 that is implemented to generate the input data 106 as a formatted output from the sentiment analysis application 104. The sentiment metadata output module 116 collects affect and sentence expression level, part-of-speech level, and sentiment vocabulary terms and scores, and organizes this data into a format that can be programmatically accessed by one or more client applications. The output metadata can also be organized into a hierarchical structure.

Example methods 200, 400, and 600 are described with reference to respective FIGS. 2, 4, and 6 in accordance with one or more embodiments of causal modeling and attribution. Generally, any of the services, components, modules, methods, and operations described herein can be implemented using software, firmware, hardware (e.g., fixed logic circuitry), manual processing, or any combination thereof. The example method may be described in the general context of executable instructions stored on a computer-readable storage memory that is local and/or remote to a computer processing system, and implementations can include software applications, programs, functions, and the like.

Figure 2:
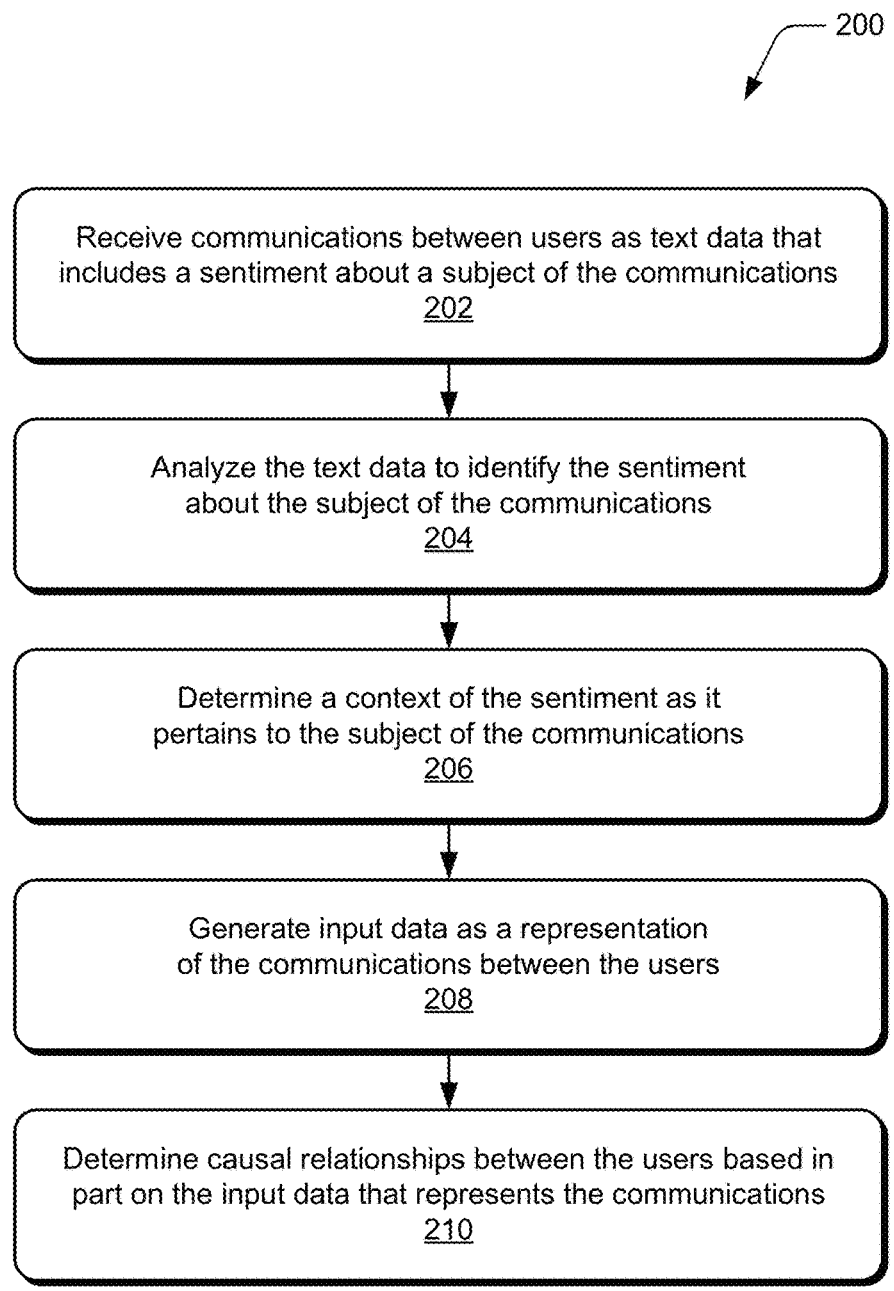
FIG. 2 illustrates example method(s) of causal modeling and attribution in accordance with one or more embodiments.

FIG. 2 illustrates example method(s) 200 of causal modeling and attribution, and is generally described with reference to a sentiment analysis application and a causal modeling application implemented by a computing device. The order in which the method is described is not intended to be construed as a limitation, and any number or combination of the method operations can be combined in any order to implement a method, or an alternate method.

At 202, communications between users are received as text data that includes a sentiment about a subject of the communications. For example, the sentiment analysis application 112 (FIG. 1) that is implemented by the computing device 102 (or implemented at a cloud-based data service as described with reference to FIG. 7) receives the text data 110 that includes a sentiment about a subject of the communications. The text data is received as part-of-speech information that includes one or more of noun expressions, verb expressions, and tagged parts-of-speech of the communications.

At 204, the text data is analyzed to identify the sentiment about the subject of the communications, and at 206, a context of the sentiment as it pertains to the subject of the communications is determined. For example, the sentiment analysis application 112 analyzes the text data 110 to identify a sentiment about the subject of the communications, and determines a context of the sentiment as it pertains to the subject of the communications.

At 208, input data is generated as a representation of the communications between the users. For example, the sentiment metadata output module 116 generates the input data 106 that is input to the causal modeling application 104. The input data can be formatted as vector space representations of the communications that are represented as values.

At 210, causal relationships between the users are determined based in part on the input data that represents the communications. For example, the causal modeling application 104 (FIG. 1) that is implemented at the computing device 102 (or implemented at a cloud-based data service as described with reference to FIG. 7) determines the causal relationships between the users based in part on the input data 106 that represents the communications.

Figure 3:
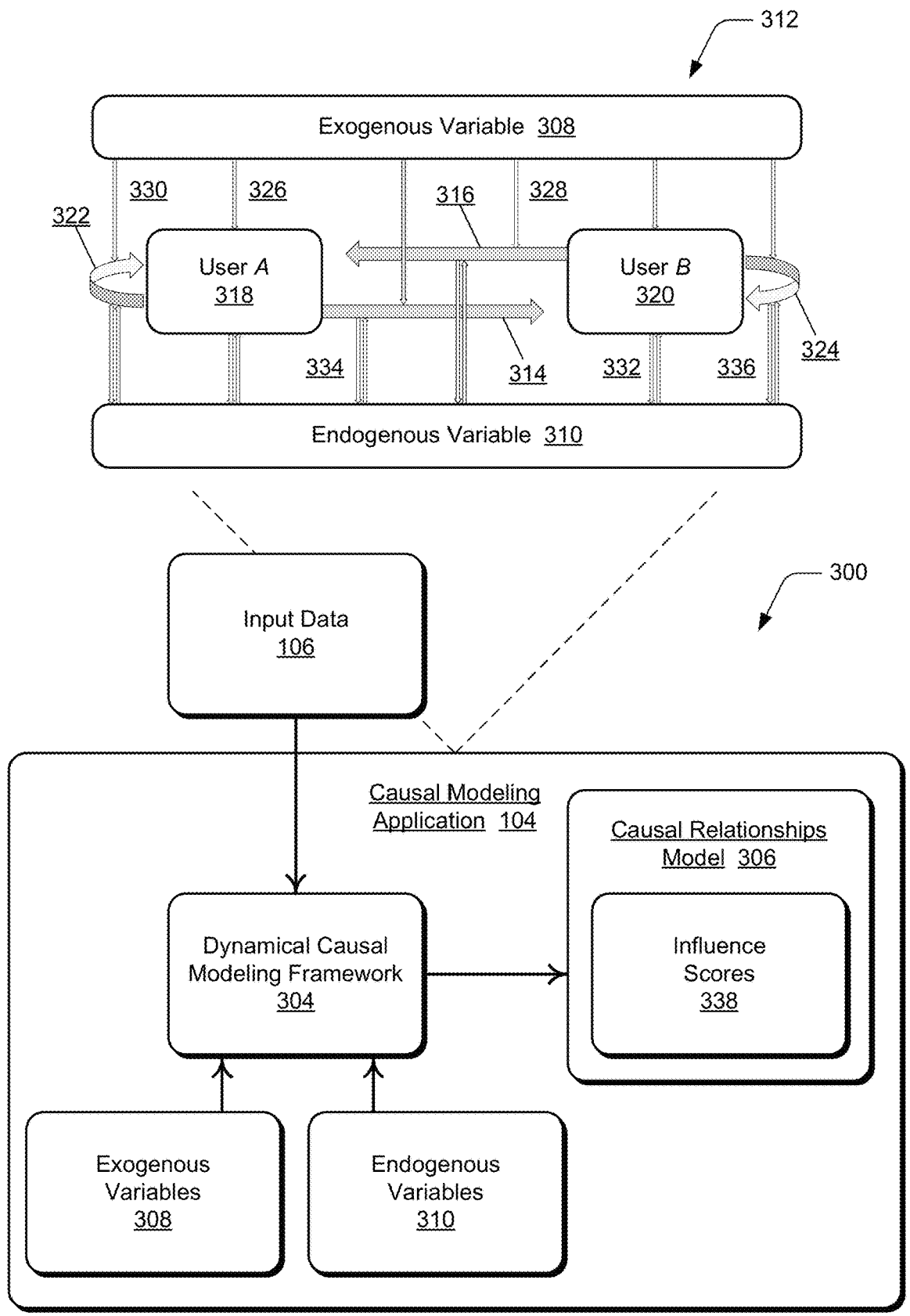
FIG. 3 illustrates an example implementation of the causal modeling application in accordance with one or more embodiments of causal modeling and attribution.

FIG. 3 illustrates an example 300 of the causal modeling application 104 that is implemented by the computing device 102 as described with reference to FIG. 1, and that implements embodiments of causal modeling and attribution. The causal modeling application 104 includes various modules and implements a dynamic causal modeling framework 302 that generates a causal relationships model 304 of the input data 106. Although shown and described as independent modules of the contextual analysis application, any one or combination of the various modules may be implemented together or independently in the causal modeling application in embodiments of causal modeling and attribution.

The dynamical causal modeling framework 302 of the causal modeling application 104 is implemented to receive the input data 106 as a representation of communications between users, and can also receive input as exogenous variables 308 and/or endogenous variables 310. The exogenous and/or endogenous variables are referred to herein as influence variables that influence the causal relationships between the users. An example system 312 illustrates communications 314, 316 between users, such as a user A 318 and a user B 320. In this example, communications 314 from user A are communicated to user B, and communications 316 from user B are communicated to user A. The dynamical causal modeling framework also accounts for hysteresis corrections associated with one or more of the users. For example, user A 318 in the example system 312 has an associated hysteresis correction 322, and user B 320 has an associated hysteresis correction 324.

The exogenous variables 308 independently influence the causal relationships without being affected by feedback from the users. In the example system 312, the exogenous variable 308 is shown to influence the users at 326, influence the communications at 328, and influence the hysteresis corrections at 330, all without feedback from the system. The endogenous variables 310 are moderated by feedback from one or more of the users, and the causal relationships between the users can be determined based on the endogenous variables that influence the causal relationships. In the example system 312, the endogenous variable 310 is shown to influence the users at 332, influence the communications at 334, and influence the hysteresis corrections at 336, all with feedback from the system.

The dynamic causal modeling framework 302 can determine the causal relationships between the users based on the input data 106 and simultaneous modeling of the exogenous variables 308 and the endogenous variables 310. The dynamic causal modeling framework 302 can generate the causal relationships model 306 based on the influence variables and the causal relationships between the users, and the causal relationships model is representative of causality, influence, and attribution between the users. The causal relationships can also be quantified with influence scores 338 that each indicate a degree to which one of the users influences a causal relationship with another of the users.

The dynamic causal modeling framework 304 uses a deterministic model to characterize the relationships between a set of concepts, entities, or words (or any other feature that can be extracted from the text, or any other input data that is externally available, such as economic indicators). The dynamic causal modeling framework models the change of a state-vector x in time, where each concept or feature is represented by a single state (this state could be a hidden state), using the following bilinear equation:

$$\dot{x} = f(x, u, \theta) = Ax + \sum_{j=1}^{m} u_j B^{(j)} x + Cu$$

$$A = \frac{\partial f}{\partial x}\bigg|_{u=0}$$

$$B = \frac{\partial^2 f}{\partial x \partial u}\bigg|$$

$$C = \frac{\partial f}{\partial u}\bigg|_{x=0}$$

where x'=dx/dt. This equation can be obtained from the bilinear Taylor approximation of any model, where changes in linguistic features in one node xi are caused by the other nodes. This bilinear form is the simplest low-order approximation that has both the endogenous (internal, interdependent) and exogenous (external, independent) causes of the dynamics. The exogenous input is represented by u(t) and the matrix A in Ax represents the dynamic coupling and interaction that is present in the absence of external influencers. For instance, when investigating the influence of holidays on discourse about online purchases, u(t) would represent external influencers such as a day of the week, holidays, and other factors that can't be influenced by the users whose dynamics are being investigated. Matrix A represents how the users, which in the case of linguistic features, topics being discussed influence each other. For instance, does talking about "services in the cloud" make people more likely to talk about "the company"? The B matrix effectively represents the way in which exogenous effects moderate the endogenous interactions that are present in the system. For instance, does the relationship described above between "services in the cloud" and "the company" change as a function of the time of the day or day of the week.

The dynamic causal modeling framework described above can be generalized to encode richer causal interactions between endogenous and exogenous users. For instance, one could begin to ask questions about how the presence of certain topics influence or moderate dynamics within the system. In the equation below, this is represented in the form of matrix D, which is the extension of the Taylor series to the second order in states.

$$f(x, u) = \left(A + \sum_{i=1}^{m} u_i B^{(i)} + \sum_{j=1}^{m} x_j D^{(j)}\right) x + Cu$$

The parameters of the dynamic causal modeling framework 304 are estimated using a Bayesian framework, which allows for empirical or theoretical priors to be enforced on the estimation procedure. Furthermore, the platform allows for regularization approaches as well as zero-mean shrinkage priors which produces more robust results. In a particular instance, the Gaussian observation error is modeled as a linear combination of covariance components and the posterior moments of the parameters are updated iteratively using variational Bayes with a fixed Laplace approximation. Gradient ascent can be used during these updates, and note the significance of the informed priors as they condition the objective function by suppressing local minima that are too far from the prior mean. The iterative approach can be coupled with a regularization scheme.

As described above, vector space representations of textual content are generated by the sentiment analysis application 112. However, the described techniques can be implemented with any vector space representation of textual content, making the approach applicable to multiple domains and businesses. In implementations, longitudinal bodies of text (e.g., chat, text stream, etc.) are converted to vector space representations using a text analytics engine. This format converts the longitudinal textual communications into multiple time series, where each time series represents the degree to which a particular topic, sentiment, or any other linguistic feature is present in the text. These time series constitute the values for the nodes xi described above, and the parameters of the model are estimated as described above. Once these parameters are obtained, the role of the endogenous and exogenous variables on the dynamics of the system can be inferred as described previously.

Figure 4:
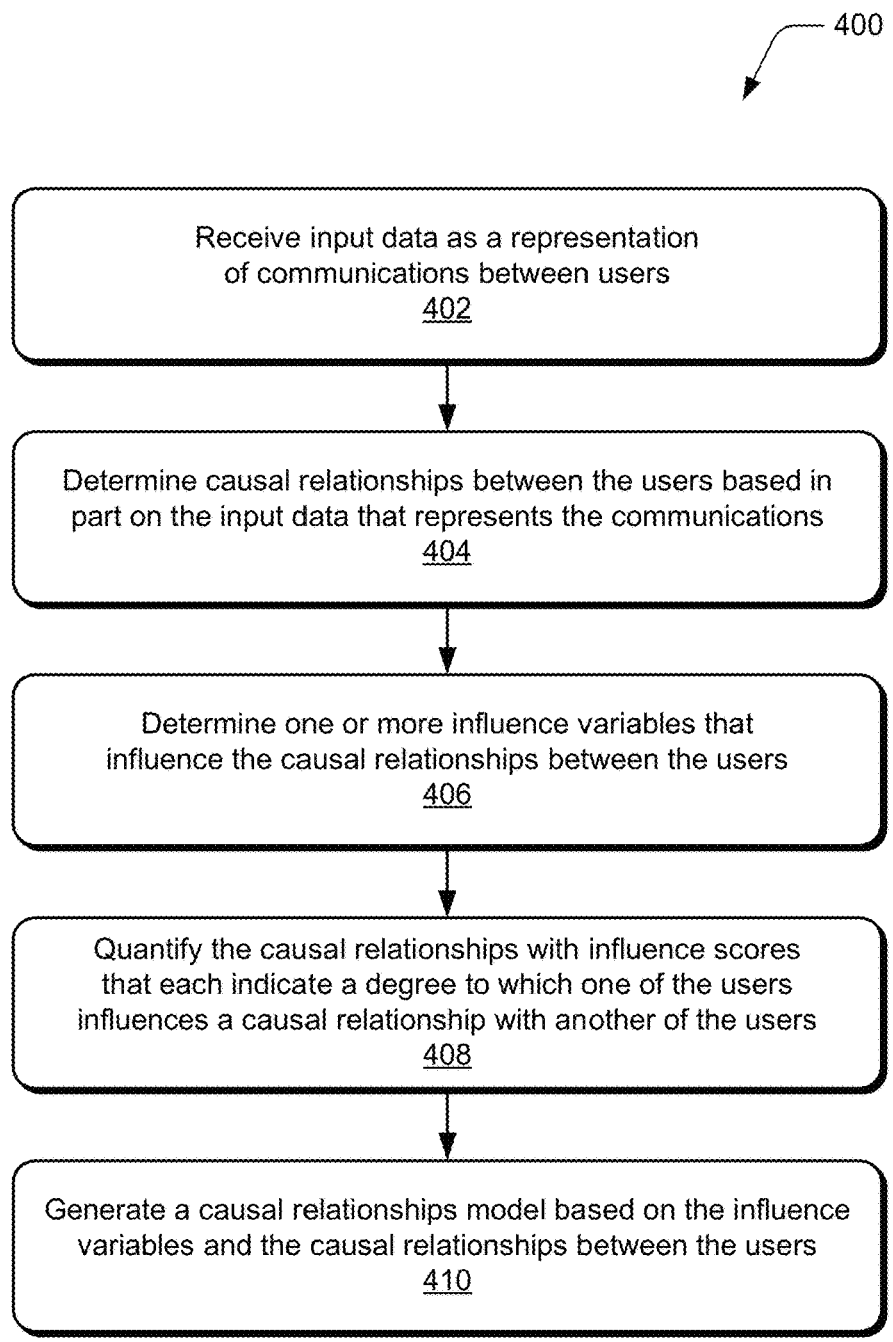
FIG. 4 illustrates example method(s) of causal modeling and attribution in accordance with one or more embodiments.

FIG. 4 illustrates example method(s) 400 of causal modeling and attribution, and is generally described with reference to a causal modeling application implemented by a computing device. The order in which the method is described is not intended to be construed as a limitation, and any number or combination of the method operations can be combined in any order to implement a method, or an alternate method.

At 402, input data is received as a representation of communications between users. For example, the dynamic causal modeling framework 304 (FIG. 3) that is implemented by the causal modeling application 104 receives the input data 106 as a representation of communications between users, such as between user A 318 and user B 320 shown in the example system 312 that illustrates the communications 314, 316 between the users.

At 404, causal relationships between the users are determined based in part on the input data that represents the communications. For example, dynamic causal modeling framework 304 determines the causal relationships between the users based in part on the input data 106 that represents the communications. Additionally, the causal relationships between the users are determined based on the input data and simultaneous modeling of the endogenous variables 310 and the exogenous variables 312.

At 406, one or more influence variables are determined that influence the causal relationships between the users. For example, the dynamic causal modeling framework 304 determines the influence variables that influence the causal relationships between the users. The influence variables can include the endogenous variables 310 that are moderated by feedback from one or more of the users, and/or can include the exogenous variables 308 that independently influence the causal relationships without being affected by feedback from the users.

At 408, the causal relationships are quantified with influence scores that each indicate a degree to which one of the users influences a causal relationship with another of the users. For example, the dynamic causal modeling framework 304 quantifies the causal relationships with the influence scores 338 that each indicate a degree to which one of the users (e.g., user A 318) influences a causal relationship with another of the users (e.g., user B 320).

At 410, a causal relationships model is generated based on the influence variables and the causal relationships between the users. For example, the dynamic causal modeling framework 304 generates the causal relationships model 306 based on the influence variables (e.g., the exogenous variables 308 and/or the endogenous variables 310) and the causal relationships between the users, and the causal relationships model is representative of causality, influence, and attribution between the users.

Figure 5:
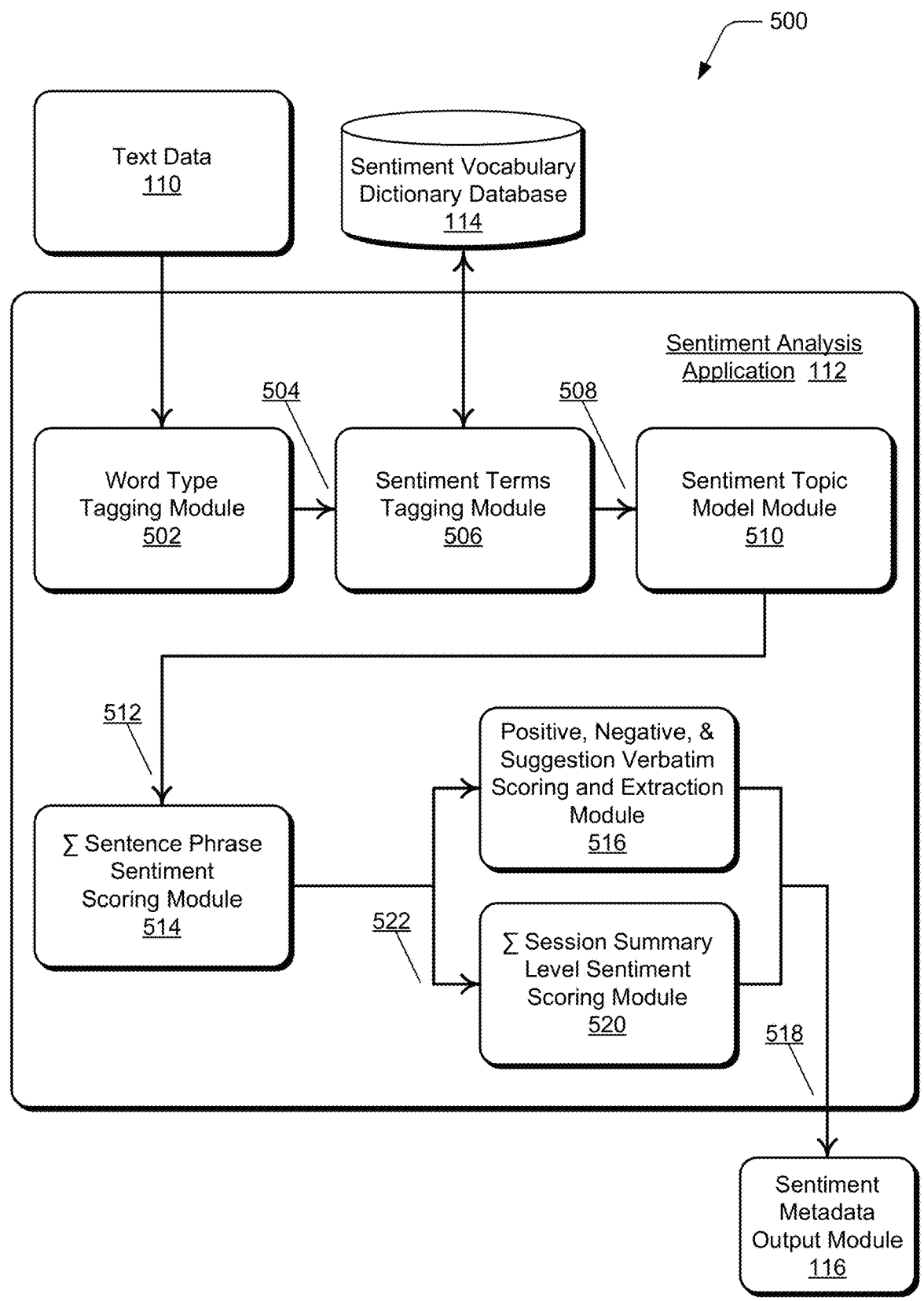
FIG. 5 illustrates an example implementation of a sentiment analysis application in accordance with one or more embodiments of causal modeling and attribution.

FIG. 5 illustrates an example 500 of the sentiment analysis application 112 that is implemented by the computing device 102 as described with reference to FIG. 1, and that implements embodiments of causal modeling and attribution. The sentiment analysis application 112 includes various modules that implement features of the sentiment analysis application. Although shown and described as independent modules of the sentiment analysis application, any one or combination of the various modules may be implemented together or independently in the sentiment analysis application in embodiments of causal modeling and attribution.

The sentiment analysis application 104 includes a word type tagging module 502 that is implemented to receive the text data 110 as the part-of-speech information that includes noun expressions, verb expressions, and tagged parts-of-speech of one or more sentences. The text data 110 can include sentences that express positive, neutral, and negative sentiments, as well as suggestions and/or recommendations about a subject of a sentence. For example, the text data 110 may include customer comments, such as "I love this software application", "I would recommend this application to others", "Your software is too expensive", and "Add some text edit features to the application".

The word type tagging module 502 is implemented to identify and tag noun, verb, adjective and adverb sentence fragment expressions, as well as tag and group parts-of-speech of the sentences. The word type tagging module 502 provides a two-level sentence tagging structure for subsequent sentiment annotation. Words within each fragment or phrase are first tagged with their part-of-speech (e.g., as a noun, verb, adjective, adverb, determiner, etc.), and then lexical expression types for each grouping of the words and part-of-speech tags are assigned. The lexical expression types include noun expressions, verb expressions, and adjective expressions, and the word type tagging module 502 generates a two-level sentence expression and part-of-speech tag structure for each sentence, which is output at 504. The output structure identifies the elements of a sentence, such as where the noun expressions are most likely to occur in the sentence, and the adjective expressions that describe the elements in the sentence.

The sentiment analysis application 112 also includes a sentiment terms tagging module 506 that is implemented to determine adjective forms of the adjective expressions utilizing the sentiment vocabulary dictionary database 114 to identify meaningful sentence phrases. The sentiment analysis application 112 receives the part-of-speech annotated source words and computes the sentiment polarity, intensity, and context for each submitted adjective, adverb, and noun term. The sentiment terms tagging module 306 can utilize the sentiment category vocabulary database 114, such as a default non-contextualized sentiment vocabulary that is constant across categories, or a domain specific contextualized sentiment vocabulary for selected categories, given one or more category context words. The sentiment terms tagging module 506 can tag and annotate each sentiment word in the two-level tag structure, and generate an annotated data structure, which is output at 508.

The sentiment analysis application 112 also includes a sentiment topic model module 510 that receives the annotated data structure and is implemented to identify and extract the key topic noun expressions from each sentence. In implementations, the sentiment topic model module 510 also accepts as input a sentiment neutral topic model, such as from the natural language contextual analysis application 108, and generates a weighted topic model indicating fine-grain sentiment for specific words and/or lexical terms, such as the noun expressions and adjective expressions. The sentiment topic model module 510 tags the noun terms of a sentence that is processed as the text data 110 as topics of the sentence based on the noun expressions, and associates each of the topics with the sentiment about the subject of the sentence. The determined topics of the input sentence text data are output as a noun expressions topic model from the sentiment topic model module at 512.

The sentiment analysis application 112 also includes a sentence phrase sentiment scoring module 514 that is implemented to aggregate the sentiment about the subject for each of the one or more topics of the sentence to score each of the noun expressions as represented by one of the topics of the sentence. The sentence phrase sentiment scoring module 514 computes the overall emotion and sentiment polarity and score for each topic model noun expression and sentence based on the earlier sentiment annotations and scores for each expression (or fragment) using individual word sentiment term scores and counts. The sentence and phrase-level sentiment scoring is performed to assign a positive or negative value score to each specific phrase within a sentence based on the presence of affect and sentiment keywords in that phrase. Phrase-level sentiment and affect scores are then summed to yield a sentence level score normalized by the total number of adjectives, adverbs, and nouns in the sentence. Sentences may have a zero score in the event that no sentiment or affect keywords are detected. The noun expression topic models are also retained at this stage for use by the sentiment metadata output module 116.

The sentiment analysis application 112 also includes a positive, negative, and suggestion verbatim scoring and extraction module 516 that is implemented to determine and extract the highest scoring positive and negative sentiment sentences, as well as actionable suggestion and/or recommendation sentences, and collect them into separate lists to indicate the most important positive, negative, and suggestion verbatims. The important (e.g., high scoring) positive, negative, and suggestion sentences are identified and extracted by the extraction module 516 by ranking the sentences based on score and by detection of actionable terms and keywords. The extraction module 516 can be implemented with heuristics that use natural language and statistics to determine the most important positive and negative verbatims, as well as the recommendations and/or suggestions. The separate lists of the most important positive, negative, and suggestion verbatims can then be accessed at the output 518 by the sentiment metadata output module 116.

The sentiment analysis application 112 also includes a session summary level sentiment scoring module 520 that is implemented to collect and count the positive and negative sentiment and affect contribution for all of the terms, and computes an aggregate affect and sentiment score. The sentence level sentiment score information and annotated terms from the sentence phrase sentiment scoring module 514 are input at 522 to the session summary level sentiment scoring module 520, which determines session or collection level sentiment scoring by computing a weighted average of all the sentence sentiment scores. The sentiment scoring module 520 can be implemented to provide a measure of the net sentiment expressed in a group of sentences that typically represent a conversation or collection of feedback comments. The sentence-level and session-level sentiment and affect statements are forwarded to the sentiment metadata output module 116 at the output 518.

The sentiment metadata output module 116 can then generate a formatted output from the sentiment analysis application 112. For example, the output module can organize the examples of the customer comments "I love this software application", "I would recommend this application to others", "Your software is too expensive", and "Add some text edit features to the application" that are input as the text data 110. The generated output can indicate verbatim positive remarks, such as "I love this software application" and "I would recommend this application to others". The generated output can also include verbatim negative remarks, such as "Your software is too expensive", as well as verbatim suggestions or recommendations, such as "Add some text edit features to the application".

Figure 6:
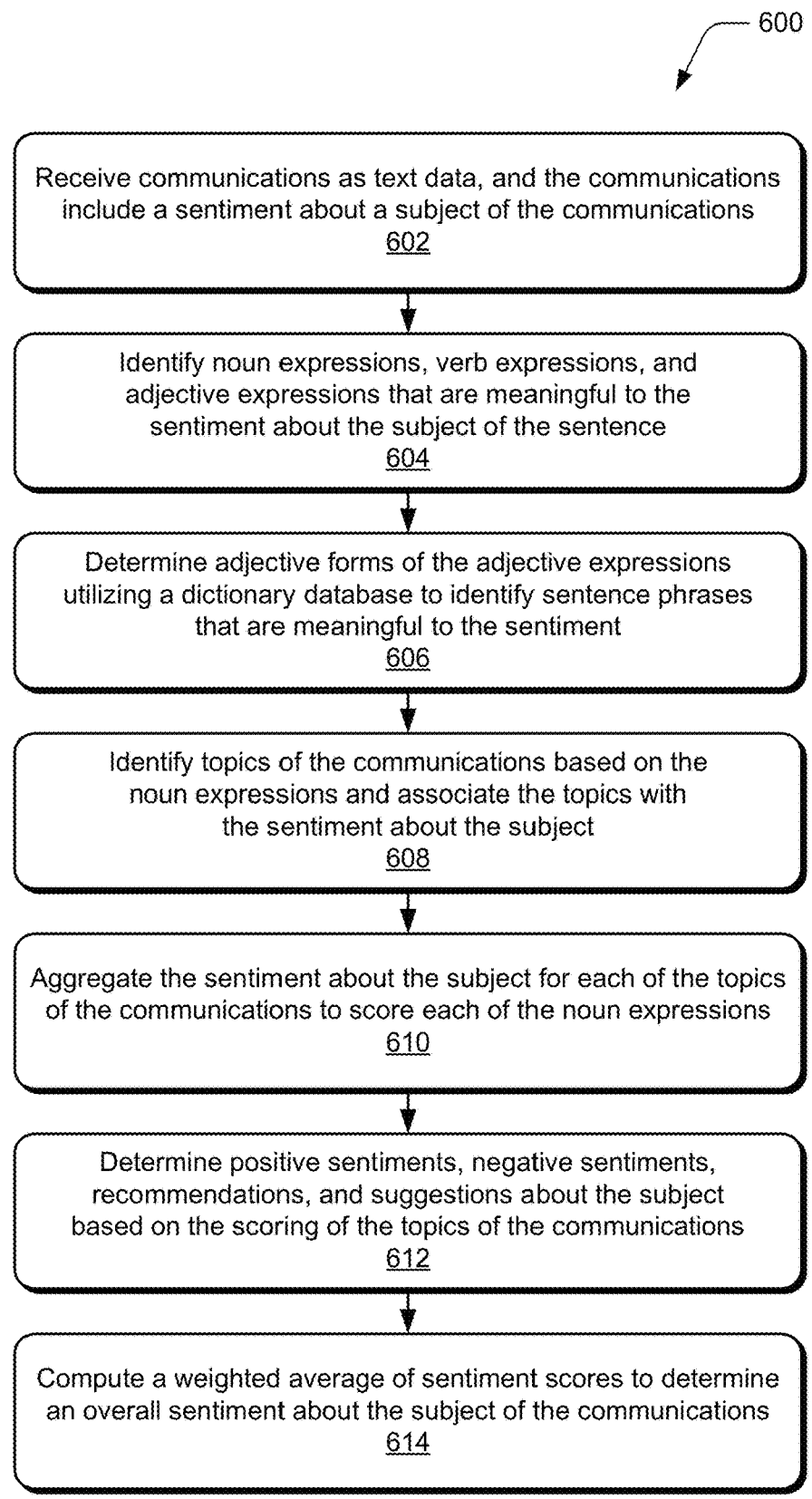
FIG. 6 illustrates example method(s) of causal modeling and attribution in accordance with one or more embodiments.

FIG. 6 illustrates example method(s) 600 of causal modeling and attribution, and is generally described with reference to a sentiment analysis application implemented by a computing device. The order in which the method is described is not intended to be construed as a limitation, and any number or combination of the method operations can be combined in any order to implement a method, or an alternate method.

At 602, communications are received as text data, and the communications include a sentiment about a subject of the communications. For example, the word type tagging module 502 (FIG. 5) of the sentiment analysis application 112 receives communications as the text data 110, and the communications include a sentiment about a subject of the communications. The text data is received as part-of-speech information that includes one or more of noun expressions, verb expressions, and tagged parts-of-speech of the sentence.

At 604, noun expressions, verb expressions, and adjective expressions that are meaningful to the sentiment about the subject are identified. For example, the word type tagging module 502 of the sentiment analysis application 112 identifies the noun expressions, the verb expressions, and the adjective expressions that are meaningful to the sentiment about the subject of the sentence from the part-of-speech information in the text data 110.

At 606, adjective forms of the adjective expressions are determined utilizing a dictionary database to identify sentence phrases that are meaningful to the sentiment about the subject. For example, the sentiment terms tagging module 506 of the sentiment analysis application 112 determines one or more adjective forms of the adjective expressions utilizing the vocabulary database 114 of categorized sentiment vocabulary words to identify sentence phrases that are meaningful to the sentiment about the subject of the communications.

At 608, topics of the communications are identified based on the noun expressions and the topics are associated with the sentiment about the subject. For example, the sentiment topic model module 510 of the sentiment analysis application 112 identifies topics of the communications based on the noun expressions, and the topics are associated with the sentiment about the subject of the communications.

At 610, the sentiment about the subject is aggregated for each of the topics of the communications to score each of the noun expressions. For example, the sentence phrase sentiment scoring module 514 of the sentiment analysis application 112 aggregates the sentiment about the subject for each of the topics of the communications to score each of the noun expressions as represented by one of the topics of the communications.

At 612, positive sentiments, negative sentiments, recommendations, and suggestions about the subject are determined based on the scoring of the topics of the communications. For example, the positive, negative, and suggestion verbatim scoring and extraction module 516 of the sentiment analysis application 112 determines positive sentiments about the subject, negative sentiments about the subject, recommendations about the subject, and/or suggestions about the subject based on the scoring of the topics of the communications.

At 614, a weighted average of sentiment scores is computed to determine an overall sentiment about the subject of the communications. For example, the session summary level sentiment scoring module 520 of the sentiment analysis application 112 computes a weighted average of sentiment scores to determine an overall sentiment about the subject of the communications.

Figure 7:
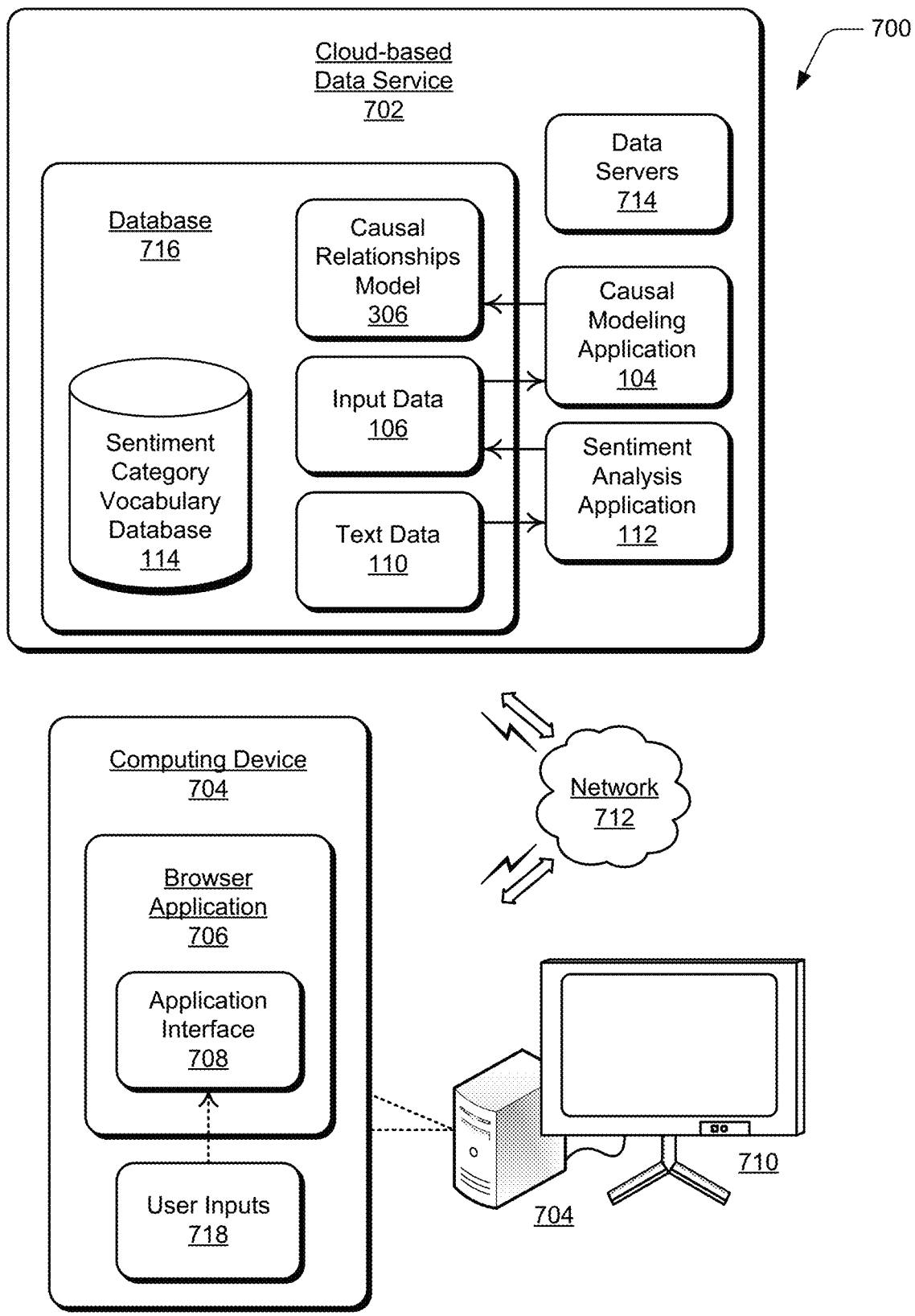
FIG. 7 illustrates an example system in which embodiments of causal modeling and attribution can be implemented.

FIG. 7 illustrates an example system 700 in which embodiments of causal modeling and attribution can be implemented. The example system 700 includes a cloud-based data service 702 that a user can access via a computing device 704, such as any type of computer, mobile phone, tablet device, and/or other type of computing device. The computing device 704 can be implemented with a browser application 706 through which a user can access the data service 702 and initiate a display of an application interface 708, such as a user interface of the causal modeling application 104, which may be displayed on a display device 710 that is connected to the computing device. The computing device 704 can be implemented with various components, such as a processing system and memory, and with any number and combination of differing components as further described with reference to the example device shown in FIG. 8.

In embodiments of causal modeling and attribution, the cloud-based data service 702 is an example of a network service that provides an on-line, Web-based version of the causal modeling application 104 that a user can log into from the computing device 704 and display the application interface 708. The network service may be utilized by any client, such as marketers and product and/or service providers, to generate analysis outputs and reports to determine topics that customers are discussing or communicating, as well as the related sentiments, emotions, and opinions that are being expressed by customers in their communications. The data service can also maintain and/or upload the text data 110 that is input to the sentiment analysis application 112, and the input data 106 that is input to the causal modeling application 104.

Any of the devices, data servers, and networked services described herein can communicate via a network 712, which can be implemented to include a wired and/or a wireless network. The network can also be implemented using any type of network topology and/or communication protocol, and can be represented or otherwise implemented as a combination of two or more networks, to include IP-based networks and/or the Internet. The network may also include mobile operator networks that are managed by a mobile network operator and/or other network operators, such as a communication service provider, mobile phone provider, and/or Internet service provider.

The cloud-based data service 702 includes data servers 714 that may be implemented as any suitable memory, memory device, or electronic data storage for network-based data storage, and the data servers communicate data to computing devices via the network 712. The data servers 714 maintain a database 716 of the input data 106, the text data 110, as well as the causal relationships model 306 that is generated by the causal modeling application 104. The cloud-based data service 702 can also include the sentiment analysis application 112 that generates the input data 106, and the database 716 may include the sentiment category vocabulary database 114 that is utilized by the sentiment analysis application 112 to generate the input data.

The cloud-based data service 702 includes the causal modeling application 104 and the sentiment analysis application 112, such as software applications (e.g., executable instructions) that are executable with a processing system to implement embodiments of causal modeling and attribution. The applications can be stored on a computer-readable storage memory, such as any suitable memory, storage device, or electronic data storage implemented by the data servers 714. Further, the data service 702 can include any server devices and applications, and can be implemented with various components, such as a processing system and memory, as well as with any number and combination of differing components as further described with reference to the example device shown in FIG. 8.

The data service 702 communicates the causal relationships model 306 and the application interface 708 of the causal modeling application 104 to the computing device 704 where the application interface is displayed, such as through the browser application 706 and displayed on the display device 710 of the computing device. The causal modeling application 104 can also receive user inputs 718 to the application interface 708, such as when a user at the computing device 704 initiates a user input with a computer input device or as a touch input on a touchscreen of the device. The computing device 704 communicates the user inputs 720 to the data service 702 via the network 712, where the causal modeling application 104 receives the user inputs.

Figure 8:
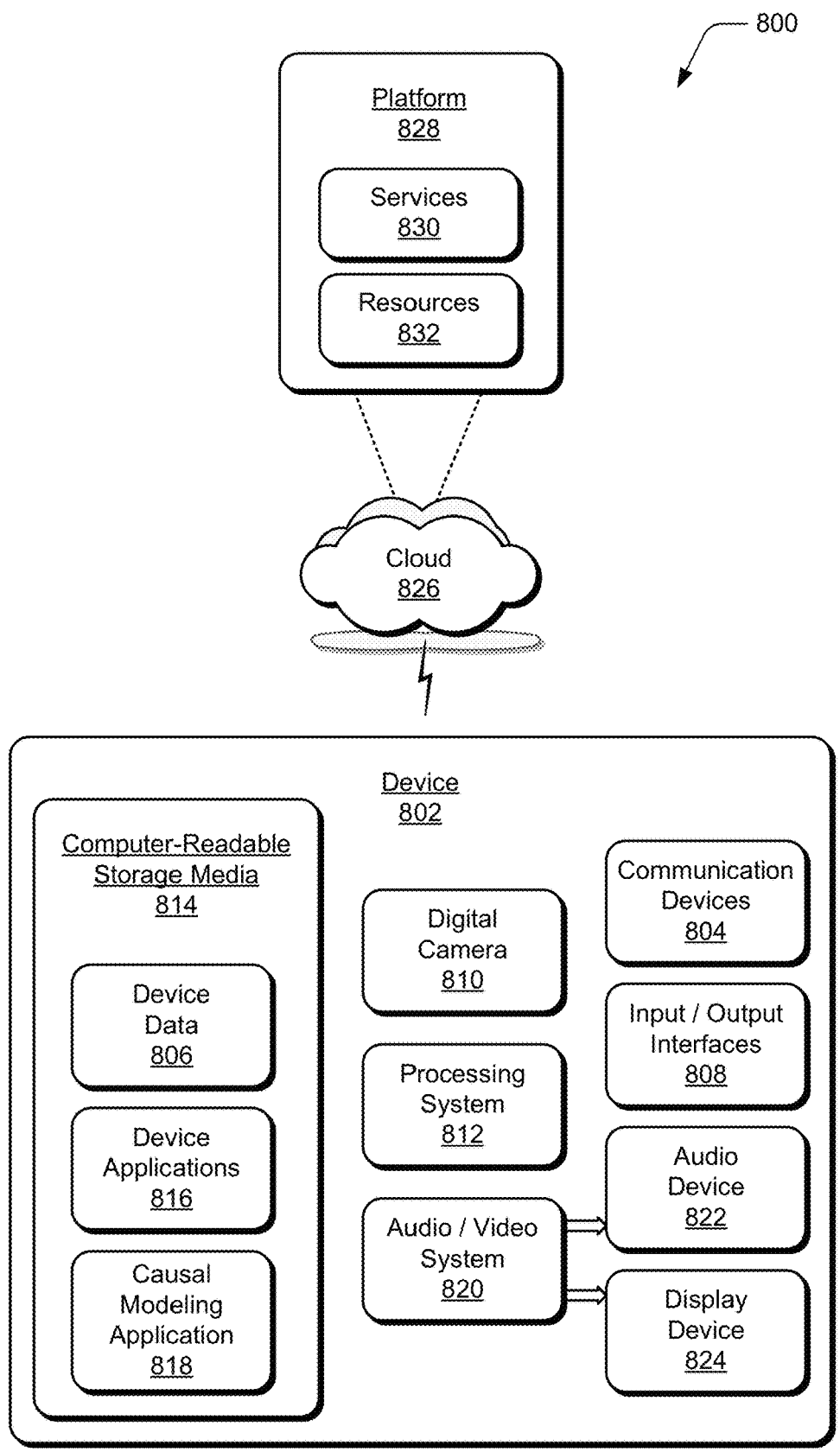
FIG. 8 illustrates an example system with an example device that can implement embodiments of causal modeling and attribution.

FIG. 8 illustrates an example system 800 that includes an example device 802, which can implement embodiments of causal modeling and attribution. The example device 802 can be implemented as any of the devices and/or server devices described with reference to the previous FIGS. 1-7, such as any type of client device, mobile phone, tablet, computing, communication, entertainment, gaming, media playback, digital camera, and/or other type of device. For example, the computing device 102 shown in FIG. 1, as well as the computing device 704 and the data service 702 (and any devices and data servers of the data service) shown in FIG. 7 may be implemented as the example device 802.

The device 802 includes communication devices 804 that enable wired and/or wireless communication of device data 806, such as user images and other associated image data. The device data can include any type of audio, video, and/or image data, as well as the images and denoised images. The communication devices 804 can also include transceivers for cellular phone communication and/or for network data communication.

The device 802 also includes input/output (I/O) interfaces 808, such as data network interfaces that provide connection and/or communication links between the device, data networks, and other devices. The I/O interfaces can be used to couple the device to any type of components, peripherals, and/or accessory devices, such as a digital camera device 810 and/or display device that may be integrated with the device 802. The I/O interfaces also include data input ports via which any type of data, media content, and/or inputs can be received, such as user inputs to the device, as well as any type of audio, video, and/or image data received from any content and/or data source.

The device 802 includes a processing system 812 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 802 may further include any type of a system bus or other data and command transfer system that couples the various components within the device. A system bus can include any one or combination of different bus structures and architectures, as well as control and data lines.

The device 802 also includes computer-readable storage media 814, such as storage memory and data storage devices that can be accessed by a computing device, and that provide persistent storage of data and executable instructions (e.g., software applications, programs, functions, and the like). Examples of computer-readable storage media include volatile memory and non-volatile memory, fixed and removable media devices, and any suitable memory device or electronic data storage that maintains data for computing device access. The computer-readable storage media can include various implementations of random access memory (RAM), read-only memory (ROM), flash memory, and other types of storage media in various memory device configurations.

The computer-readable storage media 814 provides storage of the device data 806 and various device applications 816, such as an operating system that is maintained as a software application with the computer-readable storage media and executed by the processing system 812. In this example, the device applications also include a causal modeling application 818 that implements embodiments of causal modeling and attribution, such as when the example device 802 is implemented as the computing device 102 shown in FIG. 1 or the data service 702 shown in FIG. 7. An example of the causal modeling application 818 includes the causal modeling application 104 implemented by the computing device 102 and/or at the data service 702, as described in the previous FIGS. 1-7.

The device 802 also includes an audio and/or video system 820 that generates audio data for an audio device 822 and/or generates display data for a display device 824. The audio device and/or the display device include any devices that process, display, and/or otherwise render audio, video, display, and/or image data, such as the image content of a digital photo. In implementations, the audio device and/or the display device are integrated components of the example device 802. Alternatively, the audio device and/or the display device are external, peripheral components to the example device.

In embodiments, at least part of the techniques described for causal modeling and attribution may be implemented in a distributed system, such as over a "cloud" 826 in a platform 828. The cloud 826 includes and/or is representative of the platform 828 for services 830 and/or resources 832. For example, the services 830 may include the data service 702 as described with reference to FIG. 7. Additionally, the resources 832 may include the causal modeling application 104, the sentiment analysis application 112, the natural language contextual analysis application 108, and/or the sentiment category vocabulary database 114 that are implemented at the data service as described with reference to FIG. 7.

The platform 828 abstracts underlying functionality of hardware, such as server devices (e.g., included in the services 830) and/or software resources (e.g., included as the resources 832), and connects the example device 802 with other devices, servers, etc. The resources 832 may also include applications and/or data that can be utilized while computer processing is executed on servers that are remote from the example device 802. Additionally, the services 830 and/or the resources 832 may facilitate subscriber network services, such as over the Internet, a cellular network, or Wi-Fi network. The platform 828 may also serve to abstract and scale resources to service a demand for the resources 832 that are implemented via the platform, such as in an interconnected device embodiment with functionality distributed throughout the system 800. For example, the functionality may be implemented in part at the example device 802 as well as via the platform 828 that abstracts the functionality of the cloud 826.

Although embodiments of causal modeling and attribution have been described in language specific to features and/or methods, the appended claims are not necessarily limited to the specific features or methods described. Rather, the specific features and methods are disclosed as example implementations of causal modeling and attribution.

The invention claimed is:

1. A method, comprising:
  receiving, by a computing device, communications between users that are modeled as text data, the text data including a sentiment expressed by one or more of the users about a subject in the communications;
  analyzing, by the computing device, the text data to identify the sentiment about the subject, the analyzing includes calculating a weighted average of one or more sentiment scores associated with the sentiment of the subject in the communications;
  generating, by the computing device, input data based on the weighted average of the one or more sentiment scores associated with the sentiment of the subject in the communications;
  receiving, by a computing device, the input data as a representation of communications between users of social media;
  determining, by the computing device, causal relationships between the users based in part on the input data and simultaneous modeling of one or more influence variables such that the simultaneous modeling incorporates random fluctuations associated with the one or more influence variables;
  determining, by the computing device, one or more influence variables from the one or more influence variables that influence the causal relationships between the users, the one or more influence variables including one or more endogenous variables and one or more exogenous variables, the one or more exogenous variables moderating influence of the one or more endogenous variables on the causal relationships between the users;
  generating, by the computing device, a causal relationships model based on the influence variables and the causal relationships between the users; and
  controlling, by the computing device, an instance of content based on the causal relationships model.

2. The method as recited in claim 1, further comprising quantifying, by the computing device, the causal relationships with influence scores that indicate a degree to which one or more of the users influence a causal relationship with another of the users.

3. The method as recited in claim 1, wherein the causal relationships between the users are non-symmetric, and the causal relationships model is further generated to represent the non-symmetric causal relationships.

4. The method as recited in claim 1, wherein determining the causal relationships between the users further comprises:
  applying, by the computing device, a dynamical causal modeling framework to the causal relationships.

5. The method as recited in claim 4, wherein the dynamical causal modeling framework accounts for hysteresis corrections associated with one or more of the users.

6. The method as recited in claim 1, wherein the generated input data comprises vector space representations of the communications that are represented as values.

7. The method as recited in claim 1, wherein the text data is received as part-of-speech information that includes one or more of noun expressions, verb expressions, and tagged parts-of-speech in the communications.

8. The method as recited in claim 1, wherein the causal relationships are representative of the non-symmetric influence and non-symmetric attribution between the users.

9. The method as recited in claim 1, wherein the one or more exogenous variables are independent variables that influence the causal relationships between the users without being affected by feedback from the users.

10. The method as recited in claim 1, wherein the one or more endogenous variables are dependent variables that change based on feedback from the users.

11. A computing device comprising:
  a memory configured to maintain input data that is received as a representation of social media interactions between users of social media; and
  a processor system to implement a causal modeling application that applies a dynamical causal modeling framework that is configured to:
    receive communications between users that are modeled as text data, the text data including a sentiment expressed by one or more of the users about a subject in the communications;
    analyze the text data to identify the sentiment about the subject, the analyzing includes calculating a weighted average of one more sentiment scores associated with the sentiment of the subject in the communications;

generate input data based on the weighted average of the one or more sentiment scores associated with the sentiment of the subject in the communications;

determine causal relationships between the users based in part on the input data that represents the social media interactions and simultaneous modeling of one or more influence variables such that the simultaneous modeling incorporates random fluctuations associated with the one or more influence variables;

determine one or more influence variables from the one or more influence variables that influence the causal relationships between the users, the one or more influence variables including one or more endogenous variables and one or more exogenous variables, the one or more exogenous variables moderating influence of the endogenous variables on the causal relationships between the users;

generate a causal relationships model based on the influence variables and the causal relationships between the users; and controlling an instance of content based on the causal relationships model.

12. The computing device as recited in claim 11, wherein the dynamical causal modeling framework is configured to quantify the causal relationships with influence scores that each indicate a degree to which one or more of the users influence a causal relationship with another of the users.

13. The computing device as recited in claim 11, wherein the causal relationships between the users are non-symmetric, and the causal relationships model is representative of the non-symmetric causal relationships, influence, and attribution between the users.

14. The computing device as recited in claim 11, wherein the input data that represents the social media interactions between the users comprises vector space representations of the social media interactions that are represented as values.

15. A computer-readable storage media comprising a causal modeling application stored as instructions that are executable and, responsive to execution of the instructions by a computing device, the computing device performs operations comprising:

receiving communications between users that are modeled as text data, the text data including a sentiment expressed by one or more of the users about a subject in the communications;

analyzing the text data to identify the sentiment about the subject, the analyzing includes calculating a weighted average of one or more sentiment scores associated with the sentiment of the subject in the communications;

generating input data based on the weighted average of the one or more sentiment scores associated with the sentiment of the subject in the communications;

receiving input data as a representation of communications between users of social media;

determining causal relationships between the users based in part on the input data that represents the communications and simultaneously modeling of one or more influence variables such that the simultaneous modeling incorporates random fluctuations associated with the one or more influence variables;

determining one or more influence variables from the one or more influence variables that influence the causal relationships between the users, the influence variables including one or more exogenous variables and one or more endogenous variables, the one or more exogenous variables moderating influence of the one or more endogenous variables on the causal relationships between the users;

generating a causal relationships model based on the one or more influence variables and the causal relationships between the users; and controlling an instance of content based on the causal relationships model.

16. The computer-readable storage media as recited in claim 15, wherein determining the causal relationships between the users further comprises applying a dynamic causal modeling framework to the causal relationships.

17. The computer-readable storage media as recited in claim 16, wherein the dynamic causal modeling framework accounts for hysteresis corrections associated with one or more of the users.

18. The computer-readable storage media as recited in claim 15 that comprises the causal modeling application stored as instructions that are executed, and responsive to execution of the instructions, the computing device is further configured to generate the input data as the representation of the communications between the users, the input data comprising vector space representations of the communications that are represented as values.

19. The computer-readable storage media as recited in claim 15, wherein the text data is received as part-of-speech information that includes one or more of noun expressions, verb expressions, and tagged parts-of-speech in the communications.

20. The computer-readable storage media as recited in claim 15, wherein the causal relationships are representative of the non-symmetric influence and non-symmetric attribution between the users.

* * * * *